March 5, 1957     H. E. NOLAND ET AL     2,783,485
THREADING TOOL FOR PLASTIC PIPE
Filed Oct. 6, 1954
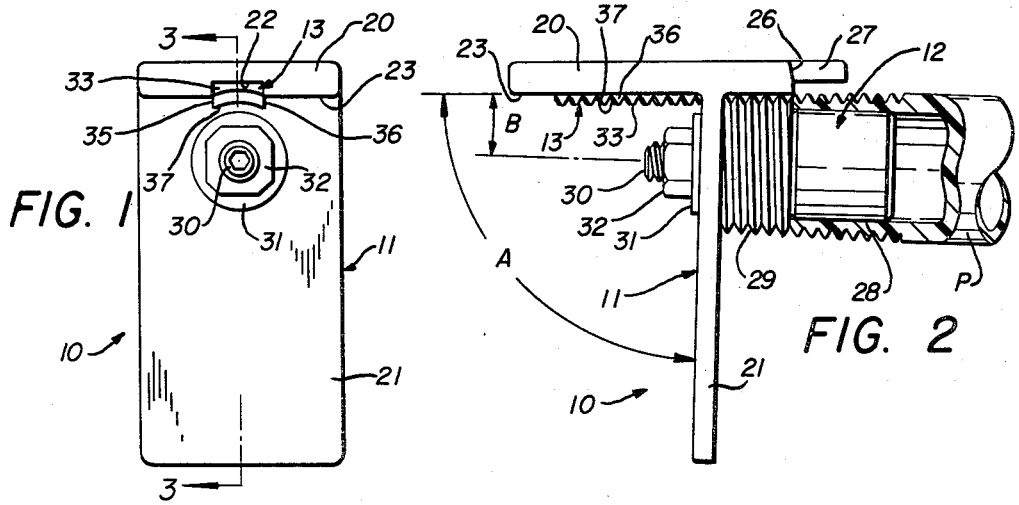
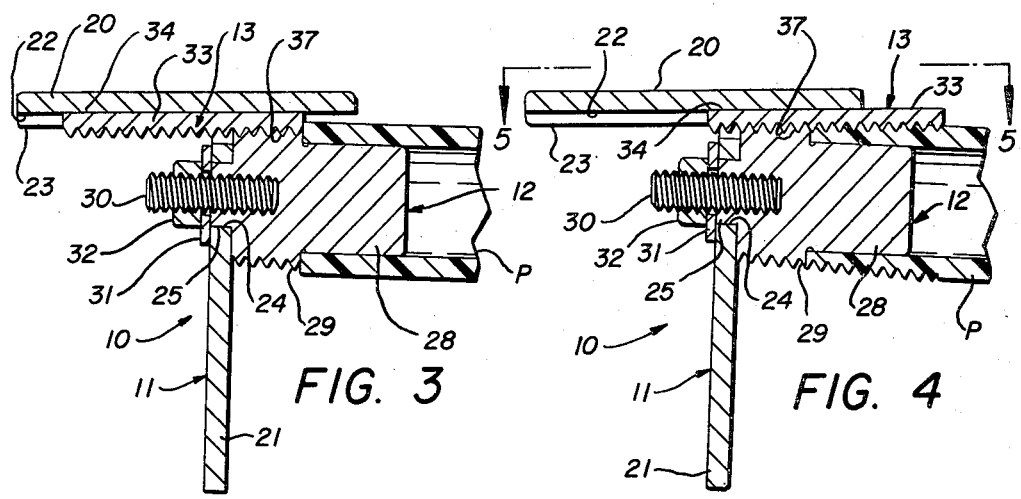
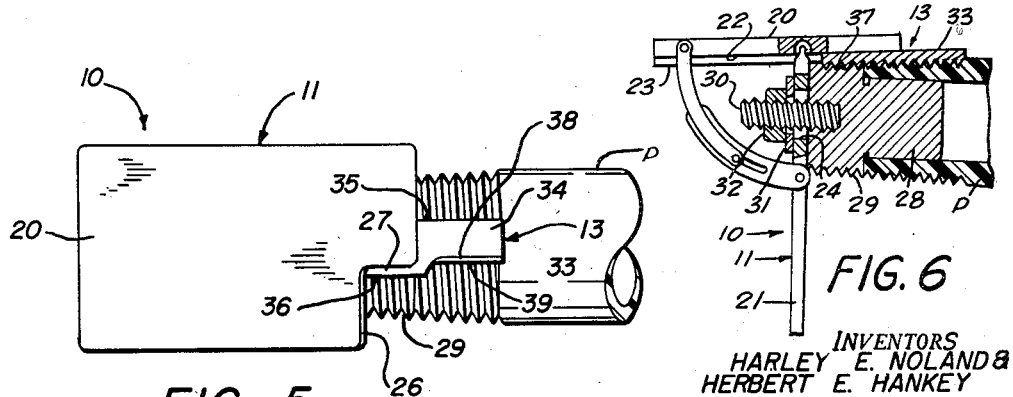
INVENTORS
HARLEY E. NOLAND &
HERBERT E. HANKEY
BY
ATTORNEY United States Patent Office 2,783,485
Patented Mar. 5, 1957

2,783,485

THREADING TOOL FOR PLASTIC PIPE

Harley E. Noland, Akron, and Herbert E. Hankey, Mogadore, Ohio

Application October 6, 1954, Serial No. 460,532

11 Claims. (Cl. 10—123)

This invention relates to thread cutting tools, and in particular, has reference to thread cutting tools designed for use in providing threads on plastic pipe.

During the past several years, several forms of thread cutting tools have been advanced for the purpose of providing metallic pipe members with threaded external surfaces. Included in the developed art of thread cutting tools, have been devices of many and varied forms, including stationary and portable tools of varying complexity.

However, with the advent of certain recently developed synthetic tubing material, known generally as plastic piping, it has been discovered that the known prior art devices for threading metallic tubing were generally incapable of producing a satisfactory thread on the external surface of a plastic pipe. The principal cause of failure in this regard, is caused by the lack of rigidity in the wall portion of the plastic pipe material. As a result, the wall portion is unable to withstand the collapsing pressure exerted by the cutting die of the threading tool. Accordingly, it has been discovered that attempts to thread plastic pipe in the conventional manner employed in the known prior art devices, will be unsuccessful, due to the fact that tubing will collapse and distort so that a proper thread cannot be provided on the external surface thereof.

At the present time, plastic piping of the nature just described, can only be provided with an external thread, by the use of relatively complicated machines that utilize a relatively small amount of radially inward cutting force during the period that the cutting die is engaging the external surface of the pipe to provide a thread. From a practical standpoint, this method abbreviates the possibility of threading plastic pipe, "on the job," with the result that current practice dictates that plastic pipe be threaded during the period of manufacture.

With the increased demand for plastic pipe because of the relatively inexpensive nature of the same, a need has arisen for an inexpensive, portable, threading tool for plastic pipe. The use requirements of such a cutting tool dictate that the same must be efficient in operation, inexpensive in manufacture and be capable of being supplied with tubing sold for installation by the purchaser. As a further requirement, it has been found advantageous, especially in the case of plastic tubing, to provide the external surface with a tapered thread instead of the conventional straight thread now used.

Accordingly, it is one object of this invention to provide a thread cutting tool that is operable to provide an external thread on a length of plastic pipe.

It is a further object of this invention to provide such a cutting tool in a simple, compact, efficient, economical and portable form, thus permitting the same to be employed at locations other than the place of manufacture.

It is a still further object of this invention to provide a portable thread cutting tool for plastic pipe that is further characterized by the fact that the same is capable of cutting tapered threads.

These and other objects of the invention will become more apparent upon a reading of the following brief specification, considered and interpreted in the light of the accompanying drawings.

Of the drawings:

Figure 1 is an end view illustrating one end of the improved cutting tool.

Figure 2 is a view taken on the lines 3—3 of Figure 1.

Figure 3 is a view similar to Figure 2, but illustrating the plastic pipe prior to having the external threads provided thereon.

Figure 4 is a view similar to Figure 3, but illustrating the plastic pipe after the same has been partially threaded by the thread cutting device.

Figure 5 is a plan view taken on the lines 5—5 of Figure 4.

Figure 6 is a view similar to Figure 2 but showing a modification wherein the angle A is adjustable.

Referring now to the drawings, and in particular, to Figures 2, 3 and 4 thereof, the improved thread cutting device, generally designated as 10, is shown positioned on one free end of a length of plastic tubing P, so as to provide the external surface thereof with a tapered thread in a manner to be described.

The thread cutting tool 10, generally includes a frame member 11 that serves as a support for a rotatable mandrel 12; and a cutting die 13, the arrangement being such that the cutting die 13 is relatively movable with respect to both the frame 11 and the mandrel 12 upon rotation of the mandrel.

As best shown in Figures 3 and 4 of the drawings, the frame member 11 includes a pair of plate members 20 and 21, that are disposed at substantially right angles with respect to each other so as to define a frame member 11 of substantially inverted T shaped configuration. While the plates 20 and 21 are generally of rectangular outline, the arrangement of these plates is such that the plane of the plate 20 is approximately parallel with the axis of the plastic tubing P being threaded, while the plane of the plate 21 is disposed at right angles to the axis of the plastic tubing P being threaded. This arrangement of component parts permits the plate 20 to slidingly receive the cutting die 13, while the substantially perpendicularly disposed plate 21 is provided for the purpose of receiving the rotatable mandrel 12 in a manner to be described. Accordingly, the plate 20 is shown provided with a longitudinally extending slot 22 on the underside 23, thereof, while the plate 21 is apertured as at 24 to rotatably receive a reduced cylindrical shoulder portion 25 of the rotatable mandrel 12. For purposes to be described, the lower right-hand corner of the plate 20 (see Figure 5) is shown cut out to define relief surfaces 26, 27 that permit chip removal during the pipe threading operation, it being understood that the relief surfaces 26 and 27 are tapered in accordance with standard procedure in this regard.

Turning now to a consideration of the rotatable mandrel 12, it will be seen from Figures 2, 3 and 4 of the drawings that the same is of generally cylindrical configuration and includes a smooth, cylindrical, axial length 28, a thread axial length 29, and the previously described, reduced shoulder portion 25 that is received in the aperture 24 of plate 21. The arrangement of the component parts is such that the smooth cylindrical surface 28 is capable of being received interiorly of the plastic pipe P as a mandrel, while the axial length 29 threadingly engages the cutting die 13 to advance the same in a manner to be described. The mandrel 12 is further illustrated as being rotatably secured with respect to the plate 21 through the medium of the threaded plug member 30, washer 31 and bolt 32, it being understood that equivalent attaching devices could be provided to permit relative rotation of the mandrel 12 with respect to the plate 21 in a similar manner.

It has been previously indicated that the cutting die 13 is longitudinally moved within the slot 22 of plate 20 upon the rotation of the mandrel 12. Accordingly, for the purpose of permitting such movement upon rotation of the mandrel 12, the cutting die 13 is shown being defined by an elongated key 33 that has the top surface 34 thereof, as well as the opposed side walls 35, 36 thereof, engageable within the confines of the slot 22. To permit engagement between the mandrel 12 and the cutting die 13, the cutting die 13 is shown as being of somewhat arcuate cross-sectional configuration, and further includes an internal threaded surface 37 that cooperatively engages with the threads 29 of the mandrel 12. In this manner, rotation of the threads 29 will cause the key 33 to move longitudinally of the slot 22 so as to advance the threads 37 into cutting engagement with pipe P. (See Figure 3.) Provision is also made in the construction of key 33 for permitting removal of chips during the thread cutting operation, and to this end, the lower right-hand corner (see Figure 5) thereof, is shown relieved as at 38 to define a knife edge 39 that urges chips outwardly and away from the thread cutting device 10 in known manner.

Throughout the specification the plates 20 and 21 have been indicated as being disposed in "substantially perpendicular" relationship with each other. In actual use, however, of the thread cutting device of this invention, it has been discovered that the angle between the plates 20 and 21 controls the degree of taper of the thread that is provided externally of the plastic tubing P. Thus, if the plates 20 and 21 are disposed in exactly perpendicular relationship with each other, it has been found that the external surface of the plastic pipe P will be provided with a straight thread, having a uniform pitch. However, if the plate 21 is disposed slightly out of perpendicular relationship to the plate 20, as is the case in Figures 1 to 5 of the drawings, it is manifest that a somewhat tapered thread will be provided externally of pipe P, it being understood that by tapered thread it is meant that the pitch of the thread is gradually increasing from left to right along the axis of the tubing P. (See Figures 2, 3 and 4.) In this regard, it has been discovered that the sum of angle A and angle B will always equal 90° and accordingly, it follows that the plate 21 could be made adjustable with respect to plate 20 to provide for adjustment in the degree of taper produced by the threading tool 10 on the plastic tubing P.

In use or operation of the improved thread cutting tool 10, the same is manually grasped by the user and the smooth cylindrical surface 28 is inserted interiorly of the pipe P so that the pipe assumes the position of Figure 3 of the drawings, with the free end thereof abutting the shoulder defined by the threaded portion 29. In this position, clock-wise movement of the plate 21 about the axis of the tubing P in Figure 1 of the drawings, will result in the key 33 moving to the right of Figure 3. As this clock-wise movement of the plate continues, the movement of the key 33 within the slot 22 will cause the threads 37 of the key 33 to engage the external surface of the tubing P, and at this point, further clock-wise rotation of the plate 21 will cause the threads 37 to cut a thread on the external surface of the pipe P as these threads approach the position of Figure 5. During the thread cutting operation, it is manifest that a tapered thread will be provided on pipe P, due to the fact that the plate 21 is disposed slightly out of perpendicular with respect to the plate 20.

When a sufficient axial length of tapered threads have been provided on the external surface of the pipe P, it is manifest that the cutting die 13 may be "backed out" of its engagement with the newly cut threads by merely reversing the rotational direction of plate 21, and accordingly, it is believed manifest that counter-clockwise movement of the plate 21 will result in the key 33 being moved to the left of Figures 3 and 4 so that the same is disengaged from the pipe P. At this time, the cylindrical surface 28, that has acted as a mandrel during the thread cutting operation, may be manually removed from the interior of the pipe P.

In the preceding paragraphs the operation of the threading tool 10 has been described on the assumption that the plastic tubing P would be held by the user while the threading tool was rotated. It is apparent that the opposite sequence of operation could be employed with equivalent results, and accordingly, it is to be understood that the plastic tubing P could be rotated while the plate 21 was held stationary. In either event, relative rotational movement is occurring between the pipe P and the plate 21, by virtue of the rotatable mandrel 12 being used in conjunction with this invention. By like token, the pipe threading device 10 of this invention has been illustrated as being adapted to cutting a "right-hand" thread on the plastic pipe P. It is accordingly manifest that the thread cutting device 10 could be modified to cut a "left-hand" thread by reversing the component parts in known manner.

It will be seen from the foregoing that there has been provided a simplified, portable threading device for use in conjunction with plastic pipe. It has been further shown how this novel threading device is simple but efficient in its operation, and how the same can be employed to provide tapered threads on the external surface of a length of plastic pipe. Additionally, it has been shown how the device can easily be modified to provide these tapered threads at any desired angle of taper.

It accordingly follows that other modifications of the invention may be resorted to without departing from the spirit thereof or the scope of the appended claims.

What is claimed is:

1. A thread cutting device for providing external threads on one end of a length of tubing, comprising; a frame member, including a pair of angularly disposed supporting plates; longitudinally extending guide means provided on one of said plates; a thread cutting die receivable in said guide means for longitudinal movement therein; a mandrel rotatably carried by said second plate of said frame member and having a free cylindrical end thereof receivable interiorly of said tubing, whereby said tubing is rotatable with said mandrel; said mandrel and said cutting die being in threaded engagement with each other whereby said cutting die will be advanced axially of said mandrel into thread cutting engagement with said tubing upon rotation of said mandrel.

2. A thread cutting device for providing external threads on one end of a length of tubing, comprising; a frame member, including a pair of angularly disposed supporting plates; longitudinally extending guide means provided on one of said plates; a thread cutting die receivable in said guide means for longitudinal movement therein; a mandrel rotatably carried by said second plate of said frame member and having a free cylindrical end thereof receivable interiorly of said tubing, whereby said tubing is rotatable with said mandrel; said mandrel and said cutting die being in threaded engagement with each other whereby said cutting die will be advanced axially of said mandrel into thread cutting engagement with said tubing upon rotation of said mandrel; said supporting plates of said frame member being disposed at an acute angle with respect to each other.

3. A thread cutting device for providing external threads on one end of a length of tubing, comprising; a frame member, including a pair of angularly disposed supporting plates; longitudinally extending guide means provided on one of said plates; a thread cutting die receivable in said guide means for longitudinal movement therein; a mandrel rotatably carried by said second plate of said frame member and having a free cylindrical end thereof receivable interiorly of said tubing, whereby said tubing is rotatable with said mandrel; said mandrel and said cutting die being in threaded engagement with each other whereby said cutting die will be advanced axially of said mandrel into thread cutting engagement with said tubing upon rotation of said mandrel; said supporting plates of said frame member being disposed at right angles with respect to each other.

4. A thread cutting device for providing external threads on one end of a length of tubing, comprising; a frame member, including a pair of angularly disposed supporting plates; longitudinally extending guide means provided on one of said plates; a thread cutting die receivable in said guide means for longitudinal movement therein; a mandrel rotatably carried by said second plate of said frame member and having a free cylindrical end thereof receivable interiorly of said tubing, whereby said tubing is rotatable with said mandrel; said mandrel and said cutting die being in threaded engagement with each other whereby said cutting die will be advanced axially of said mandrel into thread cutting engagement with said tubing upon rotation of said mandrel; said plate members being disposed with respect to each other at an acute angle falling between 75° and 90°.

5. A thread cutting device for providing external threads on one end of a length of tubing, comprising; a frame member, including a pair of angularly disposed supporting plates; longitudinally extending guide means provided on one of said plates; a thread cutting die receivable in said guide means for longitudinal movement therein; a mandrel rotatably carried by said second plate of said frame member and having a free cylindrical end thereof receivable interiorly of said tubing, whereby said tubing is rotatable with said mandrel; said mandrel and said cutting die being in threaded engagement with each other whereby said cutting die will be advanced axially of said mandrel into thread cutting engagement with said tubing upon rotation of said mandrel; said supporting plates of said frame member being disposed with respect to each other in angularly adjustable relationship.

6. A thread cutting device for providing external threads on one end of a length of tubing, comprising; a frame member, including a pair of angularly disposed supporting plates; longitudinally extending guide means provided on one of said plate members; a thread cutting die receivable in said guide means for longitudinal movement therein; a mandrel rotatably carried by said second plate of said frame member and having a free cylindrical end thereof receivable interiorly of said tubing, whereby said tubing is rotatable with said mandrel; said mandrel and said cutting die being in threaded engagement with each other whereby said cutting die will be advanced axially of said mandrel into thread cutting engagement with said tubing upon rotation of said mandrel; said threaded engagement between said mandrel and said die including a worm drive connection between the thread cutting surface of said cutting die and a threaded axial length of said rotatable mandrel.

7. A thread cutting device for providing external threads on one end of a length of tubing, comprising; a frame member, including a pair of angularly disposed supporting plates; longitudinally extending guide means provided on one of said plate members; a thread cutting die receivable in said guide means for longitudinal movement therein; a mandrel rotatably carried by said second plate of said frame member and having a free cylindrical end thereof receivable interiorly of said tubing, whereby said tubing is rotatable with said mandrel; said mandrel and said cutting die being in threaded engagement with each other whereby said cutting die will be advanced axially of said mandrel into thread cutting engagement with said tubing upon rotation of said mandrel; said guide means including an elongated slot extending across one surface of said plate in aligned relationship to the axis of said mandrel.

8. A thread cutting device for providing external threads on one end of a length of tubing, comprising; a frame member, including a pair of angularly disposed supporting plates; guide means provided on one of said plate members; a thread cutting die receivable in said guide means for relative movement with said plate; a mandrel rotatably carried by said second plate of said frame member and having a free cylindrical end thereof receivable interiorly of said tubing, whereby said tubing is rotatable with said mandrel; and means operable between said mandrel and said cutting die whereby said cutting die will be advanced axially of said mandrel into thread cutting engagement with said tubing upon rotation of said mandrel; said means including a worm drive connection between a thread cutting surface of said cutting die and a threaded cylindrical axial length of said rotatable mandrel; said guide means including an elongated slot extending across one surface of said plate in aligned relationship to the axis of said mandrel.

9. The device of claim 8 further characterized by the fact that said cutting die is defined by an elongated key receivable in said slot and having the cutting threads thereof provided on the freely presented surface thereof.

10. The device of claim 9 further characterized by the fact that said elongated key of said cutting die is of arcuate cross-sectional configuration.

11. A thread cutting device for providing external threads on one end of a length of tubing, comprising; a frame member, including a pair of angularly disposed supporting plates each of which is of substantially rectangular configuration; a longitudinally extending slot provided on one surface of one of said plates; an elongated thread cutting die receivable in said slot and being relatively movable across the longitudinal length of said plate; a mandrel rotatably carried by said second plate of said frame member and having a free cylindrical end thereof receivable interiorly of said tubing, whereby said tubing and said mandrel have a common axis of rotation that is perpendicular to the plane of said second plate; said rotatable mandrel including a threaded cylindrical axial length engageable with the threaded cutting surface of said cutting die whereby said cutting die will be advanced longitudinally in said slot upon rotation of said mandrel; said plates being disposed with respect to each other at an angle falling between 75° and 90°.

References Cited in the file of this patent
UNITED STATES PATENTS

| | | |
|---|---|---|
| 1,042,995 | Young | Oct. 29, 1912 |
| 1,231,743 | Johnston | July 4, 1917 |